United States Patent [19]

Steinbis

[11] 4,374,871
[45] Feb. 22, 1983

[54] PROCEDURE AND DEVICE FOR OILING THE INSIDE OF TUBULAR CASINGS

[75] Inventor: Fritz K. Steinbis, Gross-Gerau, Fed. Rep. of Germany

[73] Assignee: Gunter Kollross, Fed. Rep. of Germany

[21] Appl. No.: 268,549

[22] Filed: Jun. 1, 1981

[30] Foreign Application Priority Data

May 31, 1980 [DE] Fed. Rep. of Germany ....... 3020764

[51] Int. Cl.³ .......................... B05B 3/14; B05D 7/22; B05D 1/02; B05D 5/08
[52] U.S. Cl. ...................................... 427/236; 118/32; 118/35; 118/317; 118/704; 427/237
[58] Field of Search ................ 427/236, 237; 118/704, 118/317, 32, 35

[56] References Cited

U.S. PATENT DOCUMENTS

Re. 28,281 12/1974 Bridgeford ...................... 427/236 X

Primary Examiner—James R. Hoffman
Attorney, Agent, or Firm—Remy J. Van Ophem

[57] ABSTRACT

During the axial shirring of tubular casings into shirred strands while the material is inflated with air under overpressure, oil is intermittently injected without propellant air against the inside of the casing, so as to lubricate the inner wall of the casing. This eliminates the need for the costly construction required to provide for the discharge of excess air and oil needed with the known continuous oil injection through two-component nozzle with propellant air, and at the same time it insures a more uniform distribution of oil with reduced oil consumption. The injection nozzle is a single compound nozzle which is connected via electromagnetic valves to a conventional injection pump.

8 Claims, 2 Drawing Figures

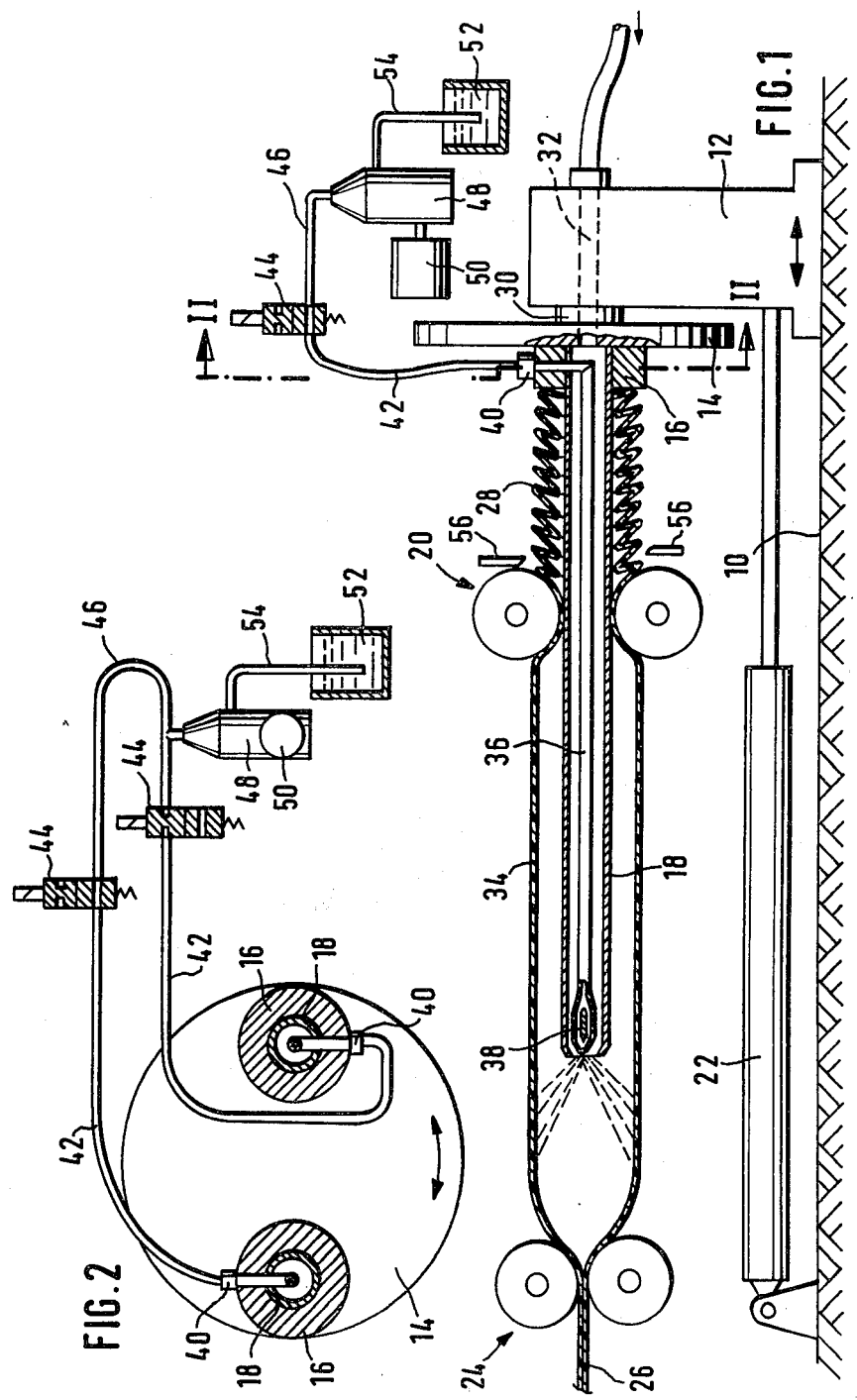

PROCEDURE AND DEVICE FOR OILING THE INSIDE OF TUBULAR CASINGS

BACKGROUND OF THE INVENTION

Oiling the inside of tubular casings is primarily practiced in the case of cellulose casings for sausage production. It reduces molding and prevents particulary runny meat emulsion from penetrating into the pores of the casing material, which in the case of peel-casing is essential for peeling the sausage mechanically on the peeling machine. In addition, shirred strands of casing material that have been oiled on the inside, no matter of which type, are on principle easier to process.

Until now, tubular casings have been oiled while being axially shirred into strands by continuous injection through a so-called two-compound nozzle under application of propellant air. To limit the pressure within the inflated section of casing in consideration of the material strength, it is necessary to provide continuous outflow of the excess propellant air and the excess oil by using special valve installations, which are costly. With the customary application of a shirring mandrel which during the shirring process extends into the inflated portion of the casing and through which the oil and the propellant air are supplied and the pressure is relieved, three separate ducts must be provided within the shirring mandrel, that is, the supply lines for the oil and the propellant air, and the relief duct for the excess air-oil mixture. Experience has also shown that while the mandrel is retracted during the shirring phase, an air cushion into which no oil is injected forms inside of the casing ahead of the nozzle. As a result, portions of the casing are not oiled, or at least the coat of oil is uneven.

SUMMARY OF THE INVENTION

It is the aim of this invention to prevent these disadvantages and to create a process for oiling the inside of tubular casings while being axially shirred into shirred strands, as well as an apparatus to execute this process, insuring a considerably more uniform oil coating with simultaneously reduced oil consumption, and which does not require special equipment for relieving pressure on the inflated casing.

The invention concerns a process for applying oil to the inside of tubular casing while it is being axially shirred into shirred strands, whereby the casing is inflated between a sealed point and the point of shirring by introducing compressed air, and oil is sprayed into the inflated area against the wall of the casing, as well as a design for executing such process with a shirring device which behind a shirring tool is provided with an overhung mounted shirring mandrel that can be extended through the shirring tool up to a pair of squeeze rolls and mechanically retracted during the shirring phase, and through which air can be supplied under over-pressure for inflating the casing between the squeeze rolls and the shirring tool, and which has at its open end a nozzle for injecting the oil supplied through a line extending through the inside of the hollow mandrel.

According to this process the problem is solved in conformity with the invention by intermittent injection without propellant air.

The invention is based on the known fact that the continuous atomizing of oil without propellant air is not possible because of the cohesion characteristics of the oil, which has also been the reason that tubular casings have to date been oiled on the inside exclusively under application of propellant air. Tests with the process according to the invention in practical application have, however, demonstrated that the use of propellant air can be dispensed with if the injection is intermittent, whereby the oil pressure should at least be 10 bar. Furthermore, the duration of each injection pulse should be between 1-10 msec. With these values it is possible to insure a uniform distribution of the oil on the inside of the tubular casing if the duration of the intervals is correspondingly timed.

Special problems arise when the place of oil injection, while a strand subsequently severed from the unshirred casing is shirred, moves mechanically from an initial position near the squeeze point into an end position behind the point of shirring, where the oil injection is switched off when the end position has been reached. This occurs regularly where mandrels are used which retract mechanically during the shirring phase and finally exit from the shirring tool to allow the shirred strand that formed on the mandrel, to be severed by a cutting device positioned immediately behind the shirring tool. When thereafter the mandrel advances again into the starting position for the next shirring process, at least the largest part of the inflated casing material ahead of the shirring tool would remain unoiled. This deficiency is eliminated with the advantageous apparatus of the process according to the invention, in that the oil injection is already switched on again as the mandrel advances into the starting position.

One apparatus for executing the process according to the invention with a shirring device having a flying mandrel situated behind a shirring tool, which advances through the shirring tool up to a pair of squeeze rolls and is mechanically retracted during the shirring phase, through which air can be supplied under overpressure for inflating the casing between the squeeze rolls and the shirring tool, and which has at its open end a nozzle for injecting the oil supplied through a line extending through the inside of the hollow mandrel, is distinguished in its design according to the invention primarily by the fact that the injection nozzle is constructed as a single component nozzle. The nozzle is appropriately connected to a conventional injection pump which can be switched on and off selectively, and through the switching cycle of which the duration of the oil injection and its timing coordination with the shirring phase are determined.

To keep the connecting line to the nozzle conveniently short, the injection pump may be movable together with the mandrel, whereby, if only one mandrel is used, it is also possible to construct the connecting line of metal, which would resist the high pressures produced by the injection pump practically without elasticity. However, special problems exist with shirring devices having two shirring mandrels attached to a rotating turret device diametrically opposite from each other for alternate positioning. Theoretically it would in this instance be possible to feed the oil through the axis of the turret, and valves on the inside of the turret device coupled to the switching motion of the turret could provide the necessary alternating oil supply to the injection nozzles at the end of the shirring mandrels. The sealing of such valves, however, is difficult in practical application in view of the high injection pressure, and it leads to unacceptable pressure loss.

According to a special refinement characteristic of the apparatus according to the invention, these difficulties are overcome in that the turret device can be switched back and forth around its switching angle. Through this measure it becomes possible to use flexible hoses on a limited length in the connecting line between the injection pump and the nozzles, whereby in the connecting lines preferably electro-magnetically controlled valves are provided, which are alternately opened and closed and thereby connect only the nozzle of the mandrel momentarily in the shirring position to the injection pump.

BRIEF DESCRIPTION OF THE DRAWINGS

The following is a detailed description of the invention in conjunction with the drawing. Shown are:

FIG. 1: a diagrammatic presentation and partially in longitudinal cross-section of a shirring device with an apparatus for executing the process according to the invention, and FIG. 2: a cross-section along line II—II in FIG. 1

DETAILED DESCRIPTION OF THE PREFERRED EMBODIMENT

The shirring device shown diagrammatically in FIG. 1 has a long bedplate 10 with a longitudinal guide (not shown) for a pedestal 12, on which a turret disc 14 can be switched back and forth by 180° by a drive medium contained in the pedestal 12. On the turret disc 14, diametrically opposite from each other, floating mounted on holders 16, are two long hollow shirring mandrels 18, one of which, depending on the indexing position of the turret disc 14, works together with a shirring tool 20 which, for example, consists of two rotating shirring wheels. With the aid of a power cylinder 22, the pedestal 12 can be shifted between a first position, in which the shirring mandrel has passed almost completely through the shirring tool 20 to the left in ref. to FIG. 1, and a second position in which the mandrel 18 has been retracted from the shirring tool 20 in ref. to FIG. 1. In the latter position the turret disc can be switched over.

In the first mentioned position the shirring mandrel advanced through the shirring tool extending up to a short spacing from a pair of squeeze rolls 24, through which the tubular casing 26 to be shirred is fed from a roll not shown, sealing it, and on to the shirring tool 20, which shirrs the tubular casing as shown at 28 into a shirred strand. The free end of the shirred strand 28 is braced against the holder 16, which together with the turret disc 14 and the mandrel 18 is moved by extending the power cylinder 22 to the right during the shirring phase according to FIG. 1.

The shirring mandrels 18 are hollow and are alternately supplied with air under slight overpressure via a duct 32 containing a valve device (not shown), which extends through the pedestal 12 and the turret disc shaft 30 so that the tubular casing 26 is inflated to its full circumference in the area between the squeeze rolls 24 and the shirring tool 20, as indicated at 34.

Through each shirring mandrel 18 extends an oil injection line 36, to which an injection nozzle 38, constructed as a single component nozzle, is connected at the open end of the mandrel. At the inside end of the mandrel 18 this line 36 extends radially outward through an opening in the hollow mandrel and a slot in the mounting holder 16 and is provided with a connecting piece 40 for a flexible hose 42, which leads to an electro-magnetically operated 2/2-acting valve. Therewith a two-way valve 44 is provided for each injection nozzle 38. On the inlet side the valves 44 are connected via lines 46 to the outlet of an injection pump 48, which can be driven controlled by an electro-motor 50. The injection pump 48 can be any surge pump that intermittently pumps oil from a reservoir 52 via a line 54 and delivers it to one or the other injection nozzle 38, depending on which of the two valves 44 is open. Preferably the injection pump is a common injection piston pump as is above all used in motor vehicles.

When the corresponding valve 44 opens, the injection pump 48 is switched on during the shirring phase, during which the shirring mandrel 18 with the nozzle 38 is retracted from the inflated portion 34 of the tubular casing 26, controlled by the power cylinder 22, corresponding to the increasing length of the shirred strand 28. As the length of the tubular material of which the shirred strand consists in several times as long as the strand itself, the tubular material 34 overtakes the retracting injection nozzle 38 during this phase and is coated on its inside with the oil ejected from the injection nozzle 38 as a fine mist. As the oil jet or mist is directed diagonally to the rear and covers a certain length of casing with each pulse, the inside of the casing is continuously coated with oil, provided the injection cycle is suitably proportioned to the overtaking motion of the tubular casing.

When the free end of the mandrel 18 has reached the shirring tool 20, it and the injection pump 48 are switched off, the mandrel is completely retracted from the shirring tool with the aid of the power cylinder 22, and a cutting device 56 severs the shirred strand 28 formed on the mandrel 18 from the remaining tubular casing 26. Now the turret device is activated by rotating the turret disc 14, it exchanges the mandrel 18 with the shirred strand 28 for the other mandrel 18, from which, if necessary, the previously shirred strand has meanwhile been removed. By again operating the power cylinder 22 in the opposite direction, the empty shirring mandrel 18 advances through the shirring tool 20 into its foremost position immediately in front of the squeeze rolls 24.

It is evident that after the shirring tool 20 and the injection pump 48 have been switched off, the greatest portion of the inflated section of casing 34 is not coated with oil. To prevent this portion of casing from being shirred without an oil coating when the shirring tool is switched on after the mandrel 18 advances, the injection pump is already switched on again immediately at the beginning of the advancing motion of the mandrel 18 into the shirring tool 20.

The above described process is now repeated again, until the shirred strand formed on the heretofore empty mandrel has reached the desired length. After the mandrel has then completely retracted from the area of the shirring tool 20 and the cutting tool 56 has severed the shirred strand from the remaining casing, the turret device now switches in the opposite direction to prevent the flexible hoses 42 from twisting. Thus it is possible to connect the injection pump 48 to the injection nozzles 38 without seals between rotating parts. Tests have demonstrated that in spite of their flexibility the relatively short flexible hose sections 42 do not reduce the injection pressure to any important degree.

Having described the invention, I claim:

1. A method of shirring and lubricating a tubular cellulose casing utilizing at least two hollow shirring mandrels mounted to a turret device, said method comprising the steps of:
1. Simultaneously inserting and moving one of said mandrels from a third predetermined position into said tubular casing and into a shirring tool to a predetermined second position;
2. inflating said tubular casing being held on said one of said shirring mandrels between a sealed joint and said shirring tool;
3. simultaneously ejecting a lubricating oil mist from said one of said mandrels onto the inside of said tubular casing as one of said mandrels is advanced to a predetermined first position adjacent said sealed joint;
4. activating said shirring tool and continuously applying a shirring force while sequentially moving said one of said mandrels from said predetermined first position toward said predetermined second position, such that a shirred strand is built up on said one of said mandrels;
5. retracting said one of said mandrels from said shirring tool to said predetermined position;
6. severing said shirred strand formed on the mandrel from the tubular casing;
7. activate said turret device to rotate said turret device such that the other of said at least two mandrels is rotated in alignment with said shirring tool and said tubular casing; and repeat steps 1 through 7.

2. The method according to claim 1 wherein said lubricating oil mist is ejected at a pressure of at least 10 bar.

3. The method according to claim 1 wherein said step of ejecting said lubricating oil mist further comprises intermittently ejecting said lubricating oil mist for a predetermined time interval.

4. The method according to claim 3 wherein said predetermined time interval is between 1 and 10 msec.

5. The method according to claim 1 further comprising the step of terminating said ejection of said lubricating oil mist when said one of said mandrels has reached said second position; and ejecting a lubricating oil mist from said one of said mandrels when said one of said mandrels moves from said third predetermined position to said second predetermined position.

6. An apparatus for shirring tubular cellulose casings, said apparatus comprising:
a base member;
a pedestal member mounted to said base member;
a rotatable turret disc member mounted to said pedestal member for rotatable movement relative to said pedestal member from a first predetermined position to a second predetermined position;
at least two hollow mandrels mounted to said turret disc member in spaced relationship and for movement with said turret disc member;
means for ejecting a lubricating fluid from said at least two hollow mandrels, said ejecting means being mounted in spaced relationship to said hollow mandrels and communicating with said hollow mandrels;
passage means for delivering a gaseous fluid to said at least two hollow mandrels, said passage means being mounted in said pedestal and turret disc member;
means for shirring said tubular casing mounted to said base member in spaced relationship to one of said two hollow mandrels when said turret disc member is at said first predetermined position; and
means for linearly moving said pedestal member relative to said shirring means such that said one of said two hollow mandrels is sequentially moved from a third predetermined position to a first predetermined position communicating with said shirring means to move said one of said mandrels into said tubular casing to said first predetermined position, said ejecting means lubricating said tubular casing as said one of said mandrels moves from said third predetermined position to said first predetermined position, said pedestal moving means further moving said one of said mandrels from said first predetermined position to a second predetermined position within said shirring means whereby said shirring means communicates with said tubular casing and said one of said mandrels to build up a shirred strand of lubricated tubular casing on said one of said mandrels, said shirring means terminating communication with said tubular casing when said one of said mandrels reaches said second predetermined position; said moving means further moving said one of said mandrels with said shirred strand of tubular casing from said second predetermined position to said third predetermined position;
means for severing said tubular casing on said one of said mandrels when said pedestal moving has moved said one of said mandrel to said third predetermined position;
means for rotatably moving said turret disc member from a first predetermined position to a second predetermined position, said first predetermined position aligning said one of said two hollow mandrels with said shirring means, said second predetermined position aligning the other of said two hollow mandrels with said shirring means; and
means for mounting said shirring means to said base member in spaced relationship to said at least two hollow mandrels.

7. The apparatus as claimed in claim 6 wherein said ejecting means further comprises:
a conduit member mounted in said rotatale turret disc and extending inside each of said at least two hollow mandrels;
an injection nozzle mounted to the end of said conduit member inside of each of said at least two hollow mandrels;
oil storage and delivery means mounted to said base member; and
flexible base means extending between said oil storage and delivery means and said conduit in the rotatable disc member, said flexible base means further comprising valve means for selectively initiating or terminating said oil delivery through said conduit to said injection nozzle of one of said mandrels when said turret disc member is in said first predetermined position.

8. The apparatus according to claim 6 or 7 wherein said two shirring mandrels are mounted opposite each other diametrically to the axis of rotation of said rotatable turret disc member such that said turret disc rotates in an oscillating motion from said first predetermined position to said second predetermined position.

* * * * *

UNITED STATES PATENT AND TRADEMARK OFFICE
CERTIFICATE OF CORRECTION

PATENT NO. : 4,374,871
DATED : February 22, 1983
INVENTOR(S) : Fritz K. Steinbis It is certified that error appears in the above-identified patent and that said Letters Patent is hereby corrected as shown below:

Column 4, line 18, delete "in" and insert ---- is ----.

Signed and Sealed this

Thirteenth Day of December 1983

[SEAL]

Attest:

GERALD J. MOSSINGHOFF

Attesting Officer

Commissioner of Patents and Trademarks